3,132,158
HALIDE-CONTAINING SILVER CATALYST FOR THE DIRECT CATALYTIC OXIDATION OF OLEFINS AND THE PROCESS OF APPLICATION
Harry Hermann Alfred Endler, Ferrara, Italy, assignor to Montecatini Società Generale per l'Industria Mineraria e Chimica, Milan, Italy
No Drawing. Filed Sept. 14, 1960, Ser. No. 55,834
6 Claims. (Cl. 260—348.5)

This invention relates to an improvement in processes for making olefinic oxides, particularly ethylene oxide, by reacting the olefin with oxygen, or with gases containing oxygen, i.e. free, molecular, or uncombined oxygen, in the presence of a silver catalyst. It particularly relates to an improved catalyst obtained by co-precipitation of silver carbonate and alkaline-earth metal carbonate or carbonates from solutions of their salts, for use in said process.

The direct combination of ethylene with oxygen, either atmospheric or contained in an inert gas mixture, in the presence of conventional catalysts, does not yield ethylene oxide as sole product. Due to the total combustion of ethylene, such processes yield a marked amount of carbon dioxide and water, together with other side-products, such as acetaladehyde.

Copending and co-assigned application Serial No. 771,724, filed November 4, 1958, by Endler and Bulgarelli, discloses an improved method for producing ethylene oxide in which halogen-containing substances which modify the catalytic properties are added to the silver catalyst. The embodying of halides in the silver catalyst directs its activity prevailingly towards the formation of the ethylene oxide, the reaction involving the total combustion of ethylene being suppressed. The preparation of the catalysts according to said application is carried out as follows. A predetermined amount of alkali or alkaline-earth halide is added to a solution containing the silver salt and one or more salts of alkaline-earth metals, the salts preferably being nitrates. From this solution the carbonates are co-precipitated by means of sodium carbonate, the halogen moiety being also precipitated at the same time and thus incorporated or embodied in the catalyst. The metal of the soluble halide can be variously chosen, since if it is an alkaline metal it remains in the solution as a cation, whilst, if it is an alkaline-earth metal, it co-precipitates together with the other alkaline-earth carbonates.

The disclosure of Serial No. 771,724 is included herein by reference, and is further summarized as follows: A process of making ethylene oxide comprising oxidizing ethylene by treating it with a free oxygen-containing gas in the presence of a silver halide containing silver catalyst, the catalyst being prepared by reacting an aqueous solution of silver nitrate and a halide with an alkali carbonate, the halide being taken from the group consisting of hydrohalides and alkali and alkaline earth halides, the halogen of which is taken from the group consisting of chlorine and bromine, the halide being present in the solution in an amount from 0.01 to 0.5 gram-equivalent per 100 gram-atoms of silver, and heating the precipitate, the halide being calcium chloride, or potassium bromide, and the carbonate being sodium carbonate, for example.

It has now been found that the coactivation effect of the halogen-containing substances on the silver catalyst can be further improved if, to the solution of the silver salts and of the alkaline-earth metals, a soluble halide is added as promoter, the cation of which halide does not remain in the solution during the co-precipitation, and which cation is not identical with one of the alkaline-earth metals of the co-precipitation. However, the soluble halide is one that is itself co-precipitated, and finally incorporated in the formed catalyst. Especially suitable as promoters are the arsenic halides, and halides of other metals of group 5A of the periodic table. The halide may be the chloride, bromide or iodide of a group 5A metal.

An object of the invention is therefore to provide a catalyst having predetermined selectivity toward the formation of ethylene oxide, and consequently antagonistic to total combustion of the olefin.

Another object of the present invention is to provide a catalyst which, due to improved activity is capable of producing (under conditions of synthesis comparable with those of other catalysts, and even at advantageous lower temperatures) a higher conversion of ethylene to oxide, and therefore better utilization of ethylene than that of other known catalysts.

The present invention will be described with particular reference to the preparation of the silver catalyst of Endler et al. U.S. Patent 2,825,701, issued March 4, 1958, and said copending application. According to the said processes, catalysts having very high activity are obtained by precipitation of the silver ion from its aqueous solution together with substances which cause a particularly fine crystalline precipitate. In practice, before the co-precipitation of the silver and alkaline-earth metal carbonates with sodium carbonate is carried out, a small but carefully determined amount of arsenic trichloride or another metal chloride of a metal of the group 5A of the periodic table is added to the solution of nitrates. When employed in a small amount, said substances can be readily brought into solution, either molecular or colloidal.

During the co-precipitation, there are now precipitated either chlorine or arsenic together with silver and alkaline earth metal carbonates. It is plausible that arsenic is bound in the form of silver or alkaline-earth metal arsenite, or as a complex salt, but I do not intend to base the invention upon a specific theory. It is possible that the traces of said extraneous substances effect a variation or change in the crystallinity of the precipitating alkaline-earth metal carbonate that serves as a carrier for the silver. In preparing the catalyst, it is very important that the halide, such as of arsenic, and/or the other metals of the group 5A of the periodic table, are incorporated in the finished catalyst.

Arsenic chloride alone, or other similar compound of this class, if co-precipitated with silver or alkaline earth metal carbonates results in a very substantial improvement in the capacities of the catalyst. In particular, there results an effective duration or stability of the said capacities even in a synthesis of long duration.

It has been found useful in co-precipitating the arsenic chloride, and other group 5A metal halides, to use a mixture of several different alkaline-earth metal salts.

A prerequisite for success in the above described co-activation of the silver catalysts is that the added amount of arsenic chloride or other group 5A metal halide is very small, for example, in the order of 0.1 mole of added chloride per 100 moles silver nitrate. The preferred range is from 0.01 to 0.5 mole of group 5A metal halide per 100 moles of the silver salt. Specifically, 0.03 mole of the metal halide per 100 moles of the silver salt are advantageously employed. Sometimes the pure reactants which are used in the co-precipitation contain said substances as impurities in this order of magnitude. In such case it is necessary to purify them carefully before employing them.

An important advantage of the hereinabove described catalyst in the oxidation of the olefins is its higher selectivity towards the formation of olefin oxides. For this reason, the amount of olefin oxide obtained is higher than with the other catalysts, despite the fact that the consumption of olefin is lower. Another advantageous characteristic is its high activity even at comparatively low reaction temperatures, so that in consequence it can be used in industrial high speed synthesis, and with recycling of most of the reaction gases, after separating the olefinic oxide.

To illustrate, but not to limit the present invention, preferred embodiments and examples are described below, for preparation of the catalyst and its use in the direct oxidation of ethylene.

The term "oxygen gas" means pure oxygen or air or other mixture of oxygen and nitrogen or inert gas, as commonly employed in this field. The term "yield" in the following examples means the ratio between number of moles or the formed ethylene oxide and the number of moles of consumed or transformed ethylene. The term "conversion" means the ratio between the number of moles of ethylene oxide formed and the number of moles of ethylene passed in contact with the catalyst. The term "space velocity" means the normal unit volumes of gas passed through a unit of volume of catalyst, per hour. Normal unit means volume of gas recalculated at 0° and 760 mm. of mercury pressure. By "metal of group 5A of the periodic table" is meant arsenic and antimony.

42 cc. barium nitrate, each having the same concentration. 10 cc. $SbCl_3$ in aqueous nitric acid, containing 1 g. of $SbCl_3$ per liter, are added to the resulting solution, which is previously filtered in order to remove any silver halide present.

The co-precipitation is carried out with 230 cc. 10% sodium carbonate aqueous solution, previously freed of any traces of halide present, as described in Example 1. After filtering, washing and drying the precipitate at 108° C., 43 grams of catalyst powder are obtained. 14 g. of this powder are suspended in a 40% aqueous glycol solution and left in a cup to impregnate 100 cc. of spherical Carborundum (6 mm. diameter), by evaporation on a water bath while agitating. The catalyst granules are heated in a muffle kiln at 400° C. for 1 hour. The weight of the catalyst, that is, of the catalytic powder is 14 g./100 g. of Carborundum carrier.

Through 100 cc. of said catalyst a gaseous mixture containing 3.8% ethylene, 7% oxygen, 6.9% carbon dioxide, the remainder being nitrogen, are passed at a space velocity of 4000 h.$^{-1}$ and over, while maintaining in the reactor a temperature of 220–230° C. The results of tests carried out with the described catalysts and those carried out with other catalysts co-precipitated in the same manner, but without the co-activator, are reported in the following table.

| Type of catalyst | Catalyst No. | Space velocity (h.$^{-1}$) | Reaction temperature (° C.) | Production from 100 cc. of catalyst (mg./h.) | Percent Yield | Percent Conversion per passage | Volume percent of oxide in the reaction gas |
|---|---|---|---|---|---|---|---|
| Co-precipitated with 31.4 mg. $AsCl_3$/100 g. Ag | 1 | 4,000 | 225 | 6,065 | 52.6 | 21.1 | 0.747 |
| Do | 2 | 4,950 | 225 | 7,536 | 59.4 | 24.1 | 0.768 |
| Co-precipitated with 39.2 mg. $SbCl_3$/100 g. Ag | 3 | 5,000 | 225 | 6,774 | 55.0 | 18.8 | 0.672 |
| Do | 4 | 6,100 | 230 | 7,734 | 59.7 | 18.7 | 0.632 |
| Co-precipitated without $AsCl_3$ | 5 | 4,100 | 225 | 3,790 | 39.8 | 12.7 | 0.464 |
| Co-precipitated with 30 mg. Cl/100 g. Ag | 6 | 4,050 | 255 | 5,290 | 50.3 | | 0.659 |
| Mixed with 15.7 mg. $As_2O_3$/100 g. Ag | 7 | 4,000 | 210 | 2,288 | 30.5 | 7.6 | 0.285 |

Example 1

40 grams of silver nitrate, and 19 grams of calcium nitrate, the latter containing four molecules of water of crystallization, together with 4.2 grams of barium nitrate, are dissolved in 630 cc. water. Since chlorides are often present in the alkaline-earth nitrates, the solution generally presents an opalescent aspect. Therefore, after stirring it with adsorbing substances, it is filtered. At the same time a dilute solution of sodium carbonate in water, having a concentration of 10%, is prepared. The latter is purified by adding 1 g. silver nitrate and then filtering off the silver carbonate precipitate, which precipitate also contains any halogen impurities present in the starting carbonate. Before co-precipitating the silver carbonate and calcium and barium carbonates, 8 cc. of aqueous $AsCl_3$, having a concentration of 1 gram per liter, are added to the solution of nitrates. After the co-precipitation of the carbonates, carried out by dropping the sodium carbonate solution onto the solution of nitrates, the precipitate is filtered, washed, and dried in an oven at 108° C. 43 grams of catalyst powder are thus obtained, 14 g. of which are suspended in a 30% ethylene glycol aqueous solution. The suspension is then used for the imbibition of 100 cc. of porous green Carborundum aggregates having an average diameter of 6 mm., in a coated china cup. The imbibition step is carried out by the evaporation of this mixture to dryness on a water bath, with stirring. The catalyst granules thus prepared are heated in a muffle kiln at 400° C. for one hour. The weight of the catalyst, that is, the weight of the catalytic powder is 14 g./100 g. of Carborundum carrier.

Example 2

400 cc. of 10% silver nitrate aqueous solution are mixed with 190 cc. calcium nitrate aqueous solution and From the above table, it is evident that the activity of the catalyst is very markedly influenced by the incorporation of As or Sb chloride. They double the yield, and improve the production up to 70%. Moreover, these increases occur at temperatures which, in spite of the high space velocity, are 20–30° C. lower than the temperatures that are normally used.

From the table it is also evident that this contemporary increase of the yield, occurring even with the decrease of the reaction temperature, cannot be obtained by mixing arsenic anhydride with the catalyst powder, nor by co-precipitation with only halogen as co-doner.

It is to be understood that the invention is not limited to the aforedescribed examples, since it is applicable, in a similar way, to other silver catalysts, without departing from the meaning, scope, and inventive principle.

The penultimate catalyst of the table has been prepared according to Example 1. Instead of $AsCl_3$ 30 mg. Cl, in the form of aqueous HCl, were added to the solution of the nitrates.

The last catalyst of the table has been prepared according to Example 1, however without adding $AsCl_3$ to the coprecipitation. To the catalytic powder thus obtained was added an amount of 15.7 mg. $As_2O_3$ for the 14 g. powder destined to the imbibition of Carborundum. The weight of the catalyst, that is, of the catalytic powder is always 14 g./100 g. of Carborundum carrier, the apparent specific weight of the Carborundum spheres having a diameter of 6 mm. is about 1.

I claim:
1. A catalyst for direct oxidation of ethylene to ethylene oxide by oxygen gas, obtained by a co-precipitation comprising reacting an aqueous solution of an inorganic, water-soluble silver salt, with at least one water-soluble, alkaline-earth metal nitrate and promoting amounts of a halide, selected from the group consisting of trichloride, tribromide and triiodide of a metal selected from the group consisting of antimony and arsenic, with sodium carbonate, said metal halide being presented in the silver salt solution in the range of about 0.01 to 0.5 mole of the metal halide per 100 moles of said silver salt.

2. In a process of making ethylene oxide by reacting ethylene with oxygen gas in the presence of a silver catalyst, the improvement comprising employing as said catalyst one made by reacting an aqueous solution of silver nitrate, calcium nitrate, barium nitrate, and arsenic trichloride, said arsenic trichloride being present in the aqueous solution in the range of about 0.01 to about 0.5 mole per 100 moles of said silver nitrate, with sodium carbonate, to co-precipitate silver carbonate, calcium carbonate, barium carbonate, and arsenic and chlorine, separating and washing the precipitate, and incorporating the precipitate with a Carborundum carrier.

3. In a process of making ethylene oxide by reacting ethylene with oxygen gas in the presence of a silver catalyst, the improvement comprising employing as said catalyst one made by reacting an aqueous solution of silver nitrate, calcium nitrate, barium nitrate, and antimony trichloride, said antimony trichloride being present in the aqueous solution in the range of about 0.01 to about 0.5 mole per 100 moles of said silver nitrate, with sodium carbonate, to co-precipitate silver carbonate, calcium carbonate, barium carbonate, and antimony and chlorine, separating and washing the precipitate, and incorporating the precipitate with a Carborundum carrier.

4. A catalyst for direct oxidation of ethylene to ethylene oxide by oxygen gas, obtained by a co-precipitation comprising reacting an aqueous silver nitrate solution, containing an alkaline-earth nitrate and from about 0.01 to about 0.5 mole of a halide, selected from the group consisting of trichloride, tribromide and triiodide, of a metal selected from the group consisting of antimony and arsenic per hundred moles of silver nitrate, with sodium carbonate.

5. A catalyst for direct oxidation of ethylene to ethylene oxide by oxygen gas, obtained by a co-precipitation comprising reacting an aqueous silver nitrate solution, containing an alkaline-earth nitrate and from about 0.01 to about 0.5 mole of antimony trichloride per hundred moles of silver nitrate, with sodium carbonate.

6. A catalyst for direct oxidation of ethylene to ethylene oxide by oxygen gas, obtained by a co-precipitation comprising reacting an aqueous silver nitrate solution, containing an alkaline-earth nitrate and from about 0.01 to about 0.5 mole of arsenic trichloride per hundred moles of silver nitrate, with sodium carbonate.

References Cited in the file of this patent

UNITED STATES PATENTS

| | | |
|---|---|---|
| 1,998,878 | Lefort | Apr. 23, 1935 |
| 2,092,295 | Van Peski et al. | Sept. 7, 1937 |
| 2,164,826 | Langwell et al. | July 4, 1939 |
| 2,406,869 | Upham | Sept. 3, 1946 |
| 2,463,228 | West et al. | Mar. 1, 1949 |
| 2,615,900 | Sears | Oct. 28, 1952 |
| 2,709,173 | Brengle et al. | May 24, 1955 |
| 2,825,701 | Endler et al. | Mar. 4, 1958 |

FOREIGN PATENTS

| | | |
|---|---|---|
| 587,584 | Great Britain | Apr. 30, 1947 |